United States Patent

[11] 3,582,166

| [72] | Inventor | Paul J. Reising<br>Birmingham, Mich. |
|---|---|---|
| [21] | Appl. No. | 831,031 |
| [22] | Filed | June 6, 1969 |
| [45] | Patented | June 1, 1971 |
| [73] | Assignee | Lear Siegler, Inc.<br>Santa Monica, Calif. |

[54] BEARING HAVING LOW-FRICTION FIBROUS SURFACE AND METHOD FOR MAKING SAME
10 Claims, 3 Drawing Figs.

| [52] | U.S. Cl. | 308/238 |
|---|---|---|
| [51] | Int. Cl. | F16c 27/00 |
| [50] | Field of Search | 308/238 |

[56] References Cited
UNITED STATES PATENTS

| 3,231,963 | 2/1966 | Berar, Jr. et al. | 308/238 |
|---|---|---|---|
| 3,110,530 | 11/1963 | Herman | 308/238 |
| 3,151,015 | 9/1964 | Griffith | 308/238 |
| 3,155,566 | 11/1964 | Fisher | 308/238 |
| 3,471,207 | 10/1969 | McCloskey | 308/238 |

*Primary Examiner*—Fred C. Mattern, Jr.
*Assistant Examiner*—Wesley S. Ratliff, Jr.
*Attorney*—Barnard, McGlynn & Reising

ABSTRACT: This invention comprehends a bearing having a low friction surface formed of fibers of a low-friction resin, preferably polytetrafluorethylene, in a hard resin matrix, the longitudinal axes of substantially all of the fibers extending substantially parallel to the surface of the bearing.

INVENTOR.
Paul J. Reising
BY
Bernard, McGlynn & Reising
ATTORNEYS

BEARING HAVING LOW-FRICTION FIBROUS SURFACE AND METHOD FOR MAKING SAME

The subject matter of the present invention is a low-friction bearing and method for making same, wherein the low-friction surface comprises fibers of a low-friction resin, preferably polytetrafluoroethylene fibers, in a matrix of a hard resin, the orientation of the fibers with respect to the surface being such as to provide a low-friction self-lubricating surface which has excellent strength and load-carrying capacity and yet which can be manufactured at relatively low cost.

Self-lubricating bearings having surfaces formed of polytetrafluoroethylene fibers in a hard resin matrix are well known in the art. The best and at the present the most commonly used composite resin self-lubricating bearing surface comprises woven cloth having at least its side or upper surface formed predominately, if not entirely, of threads of polytetrafluoroethylene, such cloth being embedded in and bonded to the bearing by a hard resin which penetrates the interstices of the cloth and serves as a matrix. Such bearings are excellent both in their lubricity and their ability to take high static and dynamic loads without excessive wear. However, they are relatively expensive chiefly because woven polytetrafluoroethylene cloth is expensive.

It is also well known in the art to form a uniform mixture of polytetrafluoroethylene powder or flock and then mold the bearing surface from the mixture. However such bearings, while quite satisfactory for many applications, do not have sufficiently high strength and wear resistance for bearing applications where high loads are encountered.

It is the principle object of the present invention to provide an improved low-friction self-lubricating bearing having a composite surface of low-friction resin fibers embedded in a hard resin matrix which can be manufactured at relatively low cost and yet which has excellent characteristics of strength, load-carrying capacity, wear resistance and lubricity. A further and attendant object is the provision of a method for manufacturing such bearings.

Briefly, these objects are accomplished in accordance with the invention by a bearing having a surface which is a composite of low-friction resin fibers, preferably polytetrafluoroethylene fibers, embedded in a hard resin, preferably a thermosetting resin, matrix, all of the low-friction resin fibers being so oriented as to be substantially parallel to the surface such that loads applied to the surface during bearing operation are in a direction substantially perpendicular to the longitudinal axes of the fibers. Such bearings can be inexpensively manufactured by laying down on a yet unhardened layer of the resin which is to serve as the matrix, a layer of relatively short straight Teflon fibers such that all of the fibers lie in substantially the same plane or in planes parallel to the plane of the layer of resin matrix, and applying sufficient pressure to embed the fibers in the matrix resin such that the matrix resin flows through and fills all of the interstices of the fiber layer, after which the desired bearing liners can be cut from the resulting composite resin sheet and bonded to a backing member, all as will hereinafter be described in greater detail.

The above and other objects, features and advantages of the invention will appear more clearly from the following detailed description thereof made with reference to the drawings in which.

Figure 1:
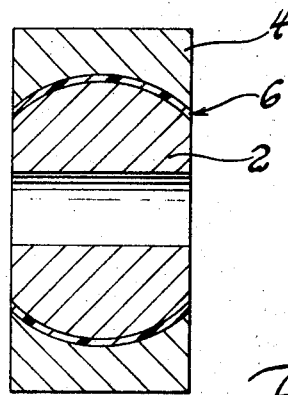
FIG. 1 is a sectional view of a spherical or self-aligning-type bearing embodying the invention.
Figure 2:
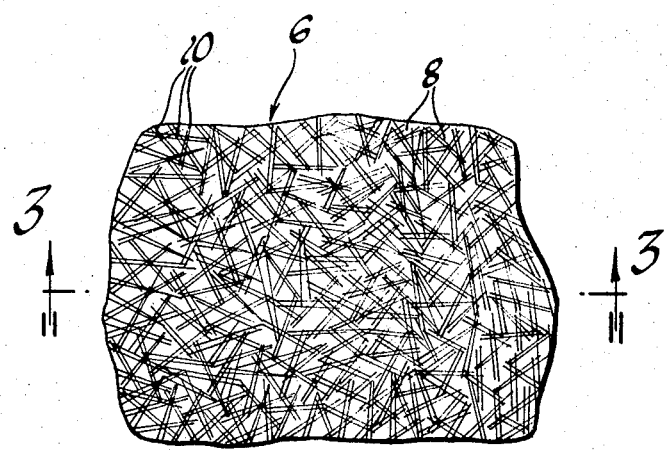
FIG. 2 is an enlarged fragmentary view of the inner surface of the liner of the bearing shown in FIG. 1.
Figure 3:
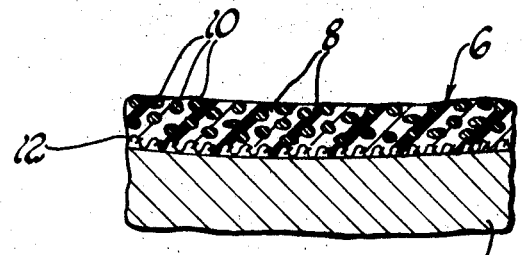
FIG. 3 is a section taken on the line 3–3 of FIG. 2.

Referring now to FIG. 1, the bearing shown comprises a truncated and bored metal ball member 2 and an outer annular metal race 4 having bonded thereto a low-friction liner 6 which is in closely mated sliding engagement with the ball member. In accordance with the present invention, the liner 6 comprises a hard resin matrix having embedded therein low-friction resin fibers each of which extends in a direction parallel to the surface of the liner which is in contact with the ball member 2. This can best be seen in FIGS. 2 and 3 wherein the hard resin matrix is shown at 8 and the reference numeral 10 depicts the low-friction resin fibers. Referring to FIG. 2, it will be seen that all of the fibers 10 exposed on the surface lie in the plane of the surface and, in this preferred embodiment, some of the fibers are at an angle to other of the fibers within the plane of the bearing surface. As can be seen in FIG. 3, the fibers below the exposed surface likewise extend parallel to the surface. Hence, any load applied to the surface by the ball member 2 is always in a direction generally perpendicular to the directions in which the fibers extend.

The fibers used for the manufacture of the liner can be obtained by chopping polytetrafluoroethylene monofilament or roving into relatively short sections. By "roving" is meant a bundle of generally parallel monofilaments. Where a roving is chopped into short sections to provide the fibers for the practice of the present invention, the surface can be formed of the resulting relatively short bundles of generally parallel fibers, all oriented as aforesaid, in the matrix of the hard resin.

In the preferred method of manufacturing the liner a piece of cloth 12 which can be of cotton, glass, Dacron or other fiber as desired and which can be loosely woven, is laid down on a flat surface and is coated and impregnated with a viscous solution or dispersion of the resin, preferably a thermosetting resin, which is to serve as the matrix. The preferred matrix resin is phenol-formaldehyde which can be applied to the cloth in the form of a viscous solution thereof containing about 60 percent solids in wood alcohol or other solvent. At this point the phenol-formaldehyde resin is in its A stage and remains tacky after being coated onto the cloth. A layer of the polytetrafluoroethylene fibers is then laid down on the phenol-formaldehyde coated cloth with the axes of substantially all of the fibers being oriented substantially parallel to the plane of the coated cloth. To facilitate the attainment of such orientation it is desirable that the fibers have a length of at least one-quarter inch. The density of the layer of fibers should be relatively uniform over the surface of the cloth and the density should preferably be such that at least about 30 percent of the surface of the finished liner is formed of the fibers. After a layer of fibers is laid down sufficient pressure can be applied to the layer of fibers, as by a polytetrafluoroethylene or a polytetrafluoroethylene coated roller or platen, to thereby further embed the fibers in the phenol-formaldehyde resin. The coated cloth can then be heated sufficiently and for a sufficient period to lightly B-stage the phenol-formaldehyde resin. Heating to about 100° C. from one-half to 1 hour is generally sufficient. At this point the phenol-formaldehyde resin should be B-staged to where there is sufficient hardness to enable easy cutting of the cloth but yet remains flexible. The desired shapes and sizes of bearing liners are then cut from the coated cloth. The liner for the bearing shown in FIG. 1 would, for example, be a strip having the width of the race and a length equal to the internal circumference of the race. To manufacture the bearing shown in FIG. 1 such strip is bonded to the interior surface of a metal cylinder which is to become the race member. Preferably the interior surface of the metal cylinder is provided with a thin coating of phenol-formaldehyde resin which can be in a tacky form to thereby facilitate securing of the liner to the interior surface of the cylinder. The lined metal cylinder is then swaged around the inner ball member by any of the conventional swaging techniques well known in the art thereby to form the cylinder to spherical shape with the lined inner surface thereof in mated sliding engagement with the inner ball member. Then the swaged assembly can be heated to about 350° F. for a sufficient period, generally from 8 to 10 hours, to fully cure the phenol-formaldehyde resin to its C-stage. After the curing operation the swaged outer member is machined to provide the desired cylindrical outer surface and the desired edge surfaces thereby resulting in the race member as shown in FIG. 1.

FIG. 3 shows a section through the liner, the cloth being shown at 12.

Metal-backed journal bearings embodying the invention can be manufactured in much the same manner except that the metal cylinder to which the liner is bonded is cured while on a cylindrical mandrel and preferably an expansible mandrel such that pressure can be applied to the liner during the curing operation. Resin-backed bearings can be manufactured by applying the liner around a core member of a mold and then injecting the desired backup resin into the mold around and against the liner.

The key feature of all embodiments of the invention is that substantially all the fibers extend in directions parallel to the surface of the liner and hence loads applied to the liner surface are substantially perpendicular to the fibers. Hence the liner provides not only good lubricity but also good load-carrying capacity and wear resistance. In the preferred embodiment some of the fibers extend at angles to other of the fibers within the plane of, or in planes parallel to, the surface of the bearing, as in the embodiment shown where the fibers, or bundles of fibers, are in random angular orientation in said planes. It will be manifest that since the fibers are not in the form of woven cloth, there is no interlocking relationship between them and hence they are held in position with respect to each other solely by the hard resin.

Whereas the invention has been described in detail specifically with reference to the use of phenol-formaldehyde as the hard resin matrix, it will be understood that other resins can be used as a matrix, for example epoxy, alkyd, malamine or polyimide resins. Also, whereas polytetrafluorethylene fibers are much preferred, where other low-friction resin fibers can be used if desired.

It is within the scope of the invention to utilize polytetrafluorethylene fibers which have been chemically etched by the chemical etching treatment well known in the art and used for the manufacture of etched polytetrafluorethylene sheet or film to increase the bondability to phenol-formaldehyde or other resins. Particularly where chemically etched Teflon roving is used in making the relatively short Teflon filaments by chopping, the roving, prior to chopping, can be coated with resin, such as B-stage phenolic resin, to thereby provide added control and ease to the chopping operation and to facilitate laying down the layer of fibers such that they all extend parallel to the surface of the resulting low-friction surface. It is also within the scope of the invention to use a resin impregnated and coated flexible open-celled cellular resin sheet, such as a resin foam sheet, in place of the resin-coated cloth described.

Hence, it will be understood that whereas the invention has been described only with reference to certain particular embodiments thereof, various changes and modification may be made all within the full and intended scope of the claims which follow:

The embodiments of the invention in which I claim an exclusive property or privilege are defined as follows:

1. A bearing element having a low-friction slide surface comprising fibers of low-friction resin embedded in a matrix of hard resin, substantially all of said fibers extending substantially parallel to said low-friction surface and said fibers being in noninterlocked relationship with respect to each other.

2. A bearing element as set forth in claim 1 wherein some of said fibers are at angles to other of said fibers.

3. A bearing element as set forth in claim 1 wherein said fibers are in random angular orientation with respect to each other.

4. A bearing element as set forth in claim 1 wherein said fibers are polytetrafluorethylene and said resin matrix is a heat-cured thermosetting resin.

5. A bearing element as set forth in claim 1 wherein said fibers are arranged in bundles of parallel fibers, some of said bundles of parallel fibers being at angles to other of said bundles of parallel fibers.

6. A bearing element as set forth in claim 1 wherein substantially all of said fibers are at least one-fourth inch in length.

7. A bearing element as set forth in claim 4 wherein said polytetrafluoroethylene fibers are etched to provide a roughened surface thereby to increase the bond strength thereof to said resin matrix.

8. A bearing comprising two bearing elements having surfaces in mated slidable engagement with each other, the surface of at least one of said elements comprising fibers of a relatively soft resin having good inherent lubricity embedded in a matrix of a relatively hard resin having less inherent lubricity, substantially all of said fibers being substantially parallel to said surface and said fibers being in noninterlocked relationship with respect to each other.

9. A bearing as set forth in claim 8 wherein some of said fibers are at an angle to other of said fibers.

10. A method for manufacturing a bearing element comprising embedding in a layer of hardenable resin a plurality of fibers of a relatively soft resin having good inherent lubricity, said fibers being in noninterlocked relationship with respect to each other and substantially all of said fibers being oriented such that they are substantially parallel to the surface of said layer of hardenable resin, and thereafter hardening said hardenable resin.